Patented Jan. 31, 1933

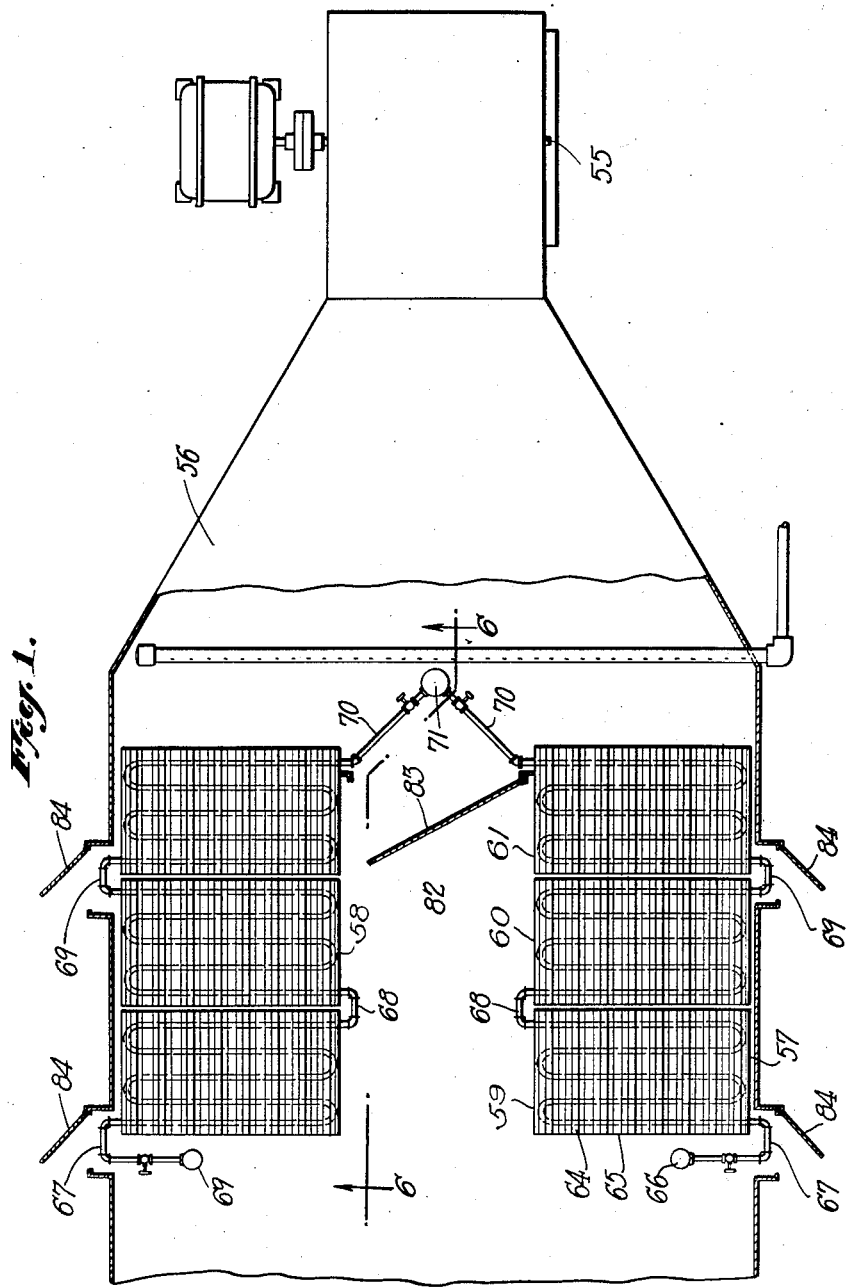

1,895,876

UNITED STATES PATENT OFFICE

IRVING T. BENNETT, OF BROOKLYN, AND FRANK C. REYNOLDS, OF NEW YORK, N. Y., ASSIGNORS, BY MESNE ASSIGNMENTS, TO METROPOLITAN ENGINEERING COMPANY, A CORPORATION OF NEW YORK

HEATING AND COOLING SYSTEM

Application filed May 17, 1929. Serial No. 363,873.

Our invention relates to heating and cooling apparatus for buildings and more particularly to apparatus and methods of ventilating and alternatively heating or cooling the air used in ventilating.

Among the objects of the invention are to provide an apparatus that may be used to directly cool a single room; to provide apparatus that may be used to either cool the air of a single room or of an entire ventilating system; to provide effective heat transferring or abstracting means for uniformly and efficiently transferring heat to or from air to be heated or cooled, and to provide cooling means readily adaptable to a variety of applications and conditions of use in a heating or cooling and ventilating system.

With these and other objects in view which will more fully appear from the following description, the invention comprises the methods and apparatus described in the following specification and claims.

The various features of the invention are illustrated in the accompanying drawings in which—

Fig. 1 is a plan view of a heating and cooling apparatus for cooling air supplied to a ventilating system embodying our invention.

Fig. 2 is a vertical section of the modification shown in Fig. 1 taken on line 6—6 of Fig. 1.

The embodiment of the invention shown in Figs. 1 and 2 is particularly adapted for the indirect heating of rooms by a supply of air through a central ventilating system. In this embodiment the air is drawn into a blower 55 and forced through a heating or air passage 56 within which are placed one or more series 57 and 58 of heating or cooling means. Various types of heating or cooling means may be employed but that shown in the drawings is preferred. In this type of heating and cooling means each of the series 57 and 58 is made up of a series of units 59, 60 and 61, three units being shown by way of example. Each of the units 59, 60 and 61 is formed of radiator elements 62 of the Murray type placed flatwise in a vertical pile upon a slightly inclined foundation 63. The radiators are so positioned that the straight lengths 64 of the pipes conveying the heating or cooling means lie transversely of the length of the air passage 56, the vanes or fins 65 thereby being positioned longitudinally and forming longitudinal channels for the passage of the air. The individual radiators of the unit 59 are connected in parallel to a common header 66 by means of individual connectors 67. Each radiator of the units 59, 60 and 61 is connected in series with a corresponding radiator of the succeeding unit by means of individual connectors or units 68 and 69. The individual radiators of the final unit 61 are connected through individual connectors 70 to a common header 71.

When the units are to be used for cooling the air passing through the air passage 56, a supply of cooling medium such as chilled brine, ice water or a refrigerating material is supplied through a pipe 72, valve 73 and inlet pipe 74 to the lower part of the header 66 and thence passes through the radiators of the units 59, 60 and 61 to the header 71, the cooling fluid passing in parallel through the individual radiators of each unit and in series with the successive units. From the header 71 the exhaust liquid passes through an outlet pipe 75 to the upper end of the header 71 through a return pipe 76 and valve 77.

When the units are to be used for heating, steam or other heating fluid is supplied through a pipe 78 and valve 79 to the pipe 75 and then passes through the radiator units in a reverse direction to the passage of the cooling medium to the header 66 and thence through the pipe 74 and a valve 80 to an outlet pipe 81 to the steam trap or other suitable outlet control means. Any number of sets of heating units may be employed to suit particular conditions or capacities and a single header may be used for more than one series of units as indicated in the arrangement of the header 71 and connecting pipe 70 in Fig. 1, or individual headers, such as indicated at 66 may be employed.

By providing a by-pass passage such as the passage 82 between the sets of heating and cooling elements in Fig. 1, and controlling the passage of air therethrough by means of a damper 83, the temperature of the air may be readily controlled. This passage 82 also provides room in which access may be had to the connectors 68, individual doors 84 being provided in the side walls for access to the connectors 67 and 69.

When the apparatus is used for cooling or chilling air to a point below its dew point, moisture condenses and collects on the pipe lengths 64 and radiator fins 65 which, having vertical faces, enable the condensed moisture to readily flow to the bottom of the units where it is received on the inclined base 63 and flows into a gutter 85.

When the apparatus is used for heating the air the humidity may be increased by means of low pressure steam supplied through a perforated pipe 86 in the lower part of the air passage 56 in advance of the heating units.

It will be apparent also that in addition to the uniform and expansive contact surfaces between the heating or cooling medium and the air, coupled with the light weight of the radiating elements, the apparatus is quickly responsive and, therefore, easily controlled to attain any desired condition of the air being treated.

What we claim is:

1. Apparatus of the type described which comprises a series of columns of flat coils of pipe piled flatwise one on another, connections between the coils of successive columns, an inlet header, an outlet header, and means for connecting said coils of columns adjacent said headers to said inlet and outlet headers.

2. A heating and cooling apparatus which comprises a number of pipe coils piled flatwise, vanes on said coils, said vanes being spaced to form channels extending in the same general direction, means for alternatively supplying a heating medium in parallel to one of said coils and for supplying a cooling medium to the opposite end and for exhausting said respective heating and cooling media from the end opposite their supply to said coils, means for passing air through said channels, and means for removing moisture condensed from said air in passing through said channels.

3. Apparatus of the type described which comprises an air passageway, a series of heating and cooling units in said passageway, said units comprising a number of pipe coils piled flatwise in said passageway, said coils comprising pipe lengths placed transversely of said passageway and connected by return bends, said coils having vanes extending longitudinally of said passageway, the coils of one unit being arranged in parallel and being arranged in series with corresponding coils of an adjacent unit, and means for alternatively supplying heating or cooling media to said heating and cooling units.

4. Apparatus of the type described which comprises an air passageway, a series of heating and cooling units in said passageway, said units comprising a number of pipe coils piled flatwise in said passageway, said coils comprising pipe lengths placed transversely of said passageway and connected by return bends, said coils having vanes extending longitudinally of said passageway, the coils of one unit being mounted in parallel and being connected by pipe unions in series with corresponding coils of an adjacent unit, means for alternatively supplying heating or cooling media to said heating and cooling units, and means to remove water from or add water to the air passing through said passageway.

In witness whereof, we have hereunto signed our names.

IRVING T. BENNETT.
FRANK C. REYNOLDS.

CERTIFICATE OF CORRECTION.

Patent No. 1,895,876.  January 31, 1933.

IRVING T. BENNETT, ET AL.

It is hereby certified that error appears in the printed specification of the above numbered patent requiring correction as follows: Page 2, line 60, claim 3, for "arranged" read "connected"; and that the said Letters Patent should be read with this correction therein that the same may conform to the record of the case in the Patent Office.

Signed and sealed this 14th day of March, A. D. 1933.

(Seal)

M. J. Moore,
Acting Commissioner of Patents.